United States Patent
Murao

(10) Patent No.: US 9,158,937 B2
(45) Date of Patent: *Oct. 13, 2015

(54) INFORMATION PROCESSING DEVICE AND INFORMATION PROCESSING PROGRAM

(75) Inventor: Shinichi Murao, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 225 days.

This patent is subject to a terminal disclaimer.

(21) Appl. No.: 13/985,586

(22) PCT Filed: Dec. 8, 2011

(86) PCT No.: PCT/JP2011/078450
§ 371 (c)(1),
(2), (4) Date: Aug. 15, 2013

(87) PCT Pub. No.: WO2012/114604
PCT Pub. Date: Aug. 30, 2012

(65) Prior Publication Data
US 2013/0326234 A1     Dec. 5, 2013

(30) Foreign Application Priority Data
Feb. 23, 2011  (JP) .................. 2011-037383

(51) Int. Cl.
*G06F 21/64* (2013.01)
*H04L 9/32* (2006.01)

(52) U.S. Cl.
CPC .............. *G06F 21/64* (2013.01); *H04L 9/3247* (2013.01); *H04L 2209/68* (2013.01)

(58) Field of Classification Search
CPC ....... G06F 21/64; G06F 21/83; H04L 9/3247; H04L 9/0825; H04L 9/3281; H04L 9/3294; H04I 63/123

See application file for complete search history.

(56) References Cited

U.S. PATENT DOCUMENTS

| | | | |
|---|---|---|---|
| 2005/0125656 A1* | 6/2005 | Mallal et al. ................. | 713/156 |
| 2005/0198298 A1* | 9/2005 | Nishikawa et al. ........... | 709/226 |
| 2006/0075245 A1* | 4/2006 | Meier ............................ | 713/176 |
| 2007/0088730 A1* | 4/2007 | Mason et al. ................. | 707/101 |
| 2007/0266253 A1* | 11/2007 | Fukasawa ..................... | 713/176 |
| 2008/0040808 A1* | 2/2008 | Tokie ............................ | 726/26 |
| 2008/0086642 A1* | 4/2008 | Takahashi .................... | 713/176 |
| 2009/0113156 A1* | 4/2009 | Fujita et al. .................. | 711/165 |
| 2009/0210520 A1* | 8/2009 | Maeno .......................... | 709/221 |
| 2013/0132718 A1* | 5/2013 | Agrawal ....................... | 713/158 |

OTHER PUBLICATIONS

International Search Report mailed Jan. 17, 2012 issued in International Appln. No. PCT/JP2011/078450.
Patent Abstracts of Japan, Publication No. 2000-059353, publication date Feb. 25, 2000.
Patent Abstracts of Japan, Publication No. 2010-050593, publication date Mar. 4, 2010.

* cited by examiner

*Primary Examiner* — Hadi Armouche
*Assistant Examiner* — Sher Khan
(74) *Attorney, Agent, or Firm* — Adams & Wilks

(57) ABSTRACT

An information processing device manages the protection state of original data by long-term signature data in storage-target data obtained by combining the long-term signature data and the original data. Management information having a management-target value for each management item obtained from the storage-target data recorded therein is acquired. A management-target value of a predetermined management item is acquired from the acquired management information. The acquired management-target value is compared with a value acquired from the storage-target data or a value acquired from the outside to determine the state of management. A result corresponding to the determined state of management is outputted.

8 Claims, 7 Drawing Sheets

(a)

(b)

INFORMATION FILE

FILE NAME OF PACKAGE OF LONG-TERM SIGNATURE DATA

HASH VALUE OF PACKAGE OF LONG-TERM SIGNATURE DATA

FINAL ATS TIME

FINAL ATS EXPIRATION DATE

TSA CERTIFICATE SERIAL NUMBER OF FINAL ATS

EXPIRATION INFORMATION DISTRIBUTION POINT OF TSA CERTIFICATE
OF FINAL ATS

ORIGINAL FILE NAME

⋮

(a)

(b)

INFORMATION PROCESSING DEVICE AND INFORMATION PROCESSING PROGRAM

BACKGROUND OF THE INVENTION

1. Technical Field

The present invention relates to an information processing device and an information processing program, and for example, to a technique for processing long-term signature data.

2. Background Art

In order to certify unfalsification (authenticity) of electronic data, an electronic signature is widely used in which electronic data is encrypted with a secret key to perform the electronic signature, and then electronic data is decrypted with a public key corresponding to the secret key to verify the electronic signature.

Electronic data is decrypted with the public key, and thus it can be confirmed that electronic data is encrypted with the secret key corresponding to the public key. However, since a signatory has the secret key, it can be certified that electronic data is generated by the signatory. For example, the secret key functions as a seal, and the public key functions as a certificate of the seal.

The public key is distributed by a public key certificate which is issued by a certificate authority, and when the public key is distributed, the authenticity of the public key can be confirmed by the certificate.

Meanwhile, the electronic signature has an expiration date which is set so as to cope with a compromise or the like of an encryption algorithm used in the signature or the like.

Even before the expiration date, the electronic signature may be expired according to signatory's convenience or all certificates following a root certificate may be expired if the secret key is omitted.

Accordingly, in order to cope with the above-described problem, as in PTL 1, an electronic signature format (hereinafter, referred to as long-term signature format) for perpetuating the validity of an electronic signature is specified.

In the long-term signature format, an archive time stamp (ATS) which is a time stamp having an expiration date longer than an electronic signature is applied to electronic data to be stored and the electronic signature, thereby securing the legitimacy of the electronic data even after the expiration date of the electronic signature has elapsed.

Before the expiration date of the archive time stamp elapses, a second-generation archive time stamp having an expiration date longer than the archive time stamp is applied to extend the expiration date. Hereinafter, the expiration date is extended to the third-generation, the fourth-generation, . . . , making it possible to verify unfalsification of electronic data over a long period of time.

In this way, in regard to long-term signature data, before the expiration date of a final archive time stamp is off, the next-generation archive time stamp is applied to extend the expiration date.

Meanwhile, in general, since the expiration date of the archive time stamp is long to be 10 years, even if long-term signature data or original data is destructed, or the validity of the archive time stamp is lost, there is a possibility that destruction or expiration is noticed after 10 years.

For this reason, it is necessary to perform expiration date extension processing at an appropriate timing while constantly confirming that the long-term signature data is valid.

In regard to the verification, it is necessary to confirm non-destruction of data or the validity of the final archive time stamp.

However, if the verification is done for all pieces of stored long-term signature data, there is a problem in that a lot of cost and time is required for computation processing.

For example, in confirming the validity of the final archive time stamp, verification of a hash value of a time stamp, verification of a signature, verification of expiration information, verification of an authentication path, and verification of an expiration date are required.

CITATION LIST

Patent Literature

[PTL 1] JP-T-2003-533940

SUMMARY OF INVENTION

An object of the invention is to efficiently confirm validity of a long-term signature.

Solution to Problem

According to a first aspect of the invention, there is provided an information processing device which manages the protection state of original data by long-term signature data in storage-target data obtained by combining the long-term signature data and the original data. The information processing device includes management information acquisition means for acquiring management information having a management-target value for each management item obtained from the storage-target data recorded therein, management-target value acquisition means for acquiring a management-target value of a predetermined management item from the acquired management information, determination means for comparing the acquired management-target value with a value acquired from the storage-target data or a value acquired from the outside to determine the state of management, and output means for outputting the determined determination result.

According to a second aspect of the invention, in the information processing device according to the first aspect of the invention, the storage-target data is formed as a single file.

According to a third aspect of the invention, in the information processing device according to the first or second aspect of the invention, the management-target value is a value acquired from the storage-target data in advance.

According to a fourth aspect of the invention, in the information processing device according to any one of the first to third aspects of the invention, one of the management items is the determination of non-destruction of the storage-target data, the management-target value acquisition means acquires the hash value of the storage-target data from the management information as a management-target value when it is confirmed that the storage-target data is not destructed, and the determination means computes the hash value of the storage-target data and compares the hash value of the storage-target data with the acquired hash value to determine non-destruction of the stored data.

According to a fifth aspect of the invention, in the information processing device according to any one of the first to fourth aspects of the invention, one of the management items is the management of the expiration date of the long-term signature data, the management-target value acquisition means acquires the expiration date of the long-term signature data from the management information as a management-target value, and the determination means compares the determination point of time of the storage-target data with the acquired expiration date to determine necessity for extension of the expiration date of the long-term signature data.

According to a sixth aspect of the invention, in the information processing device according to any one of the first to fifth aspects of the invention, one of the management items is the determination of the validity of the long-term signature data, the management-target value acquisition means acquires specification information for specifying an archive time stamp to be used by the long-term signature data and source information of expiration information of the archive time stamp from the management information as a management-target value, and the determination means acquires the expiration information using the acquired source information and compares the acquired expiration information with the acquired specification information to determine the validity of the long-term signature data.

According to a seventh aspect of the invention, there is provided an information processing program which causes a computer to exhibit a function of managing the protection state of original data by long-term signature data in storage-target data obtained by combining the long-term signature data and the original data. The information processing program causes the computer to realize a management information acquisition function of acquiring management information having a management-target value for each management item obtained from the storage-target data recorded therein, a management-target value acquisition function of acquiring a management-target value of a predetermined management item from the acquired management information, a determination function of comparing the acquired management-target value with a value acquired from the storage-target data or a value acquired from the outside to determine the state of management, and an output function of outputting the determined determination result.

According to the invention, information data for confirming the validity of long-term signature is used, thereby efficiently confirming the validity of long-term signature data.

DETAILED DESCRIPTION OF THE INVENTION (1) Outline of Embodiment

A long-term signature group (FIG. 3(a)) has a package of long-term signature data and an information file. The package of long-term signature data is obtained by compressing original data and XAdES as long-term signature data of original data into a single file.

In the information file, the hash value of the package of long-term signature data, the expiration date of ATS to be used in XAdES, the distribution point of expiration information of a TSA public key certificate corresponding to a TSA secret key used for ATS issuance, the serial number of the TSA public key certificate, and the like are recorded.

A client terminal 3 (FIG. 1) computes the hash value of the package of long-term signature data and compares the hash value of the package of long-term signature data with the hash value recorded in the information file to confirm non-destruction of the package of long-term signature data.

The client terminal 3 can confirm the expiration date of ATS by the expiration date recorded in the information file without analyzing the package of long-term signature data.

The client terminal 3 obtains expiration information from the distribution point of the expiration information of the TSA public key certificate corresponding to the TSA secret key used for ATS issuance and compares the serial number of the TSA public key certificate with the expiration information to confirm the validity of ATS.

(2) Details of Embodiment

Figure 1:
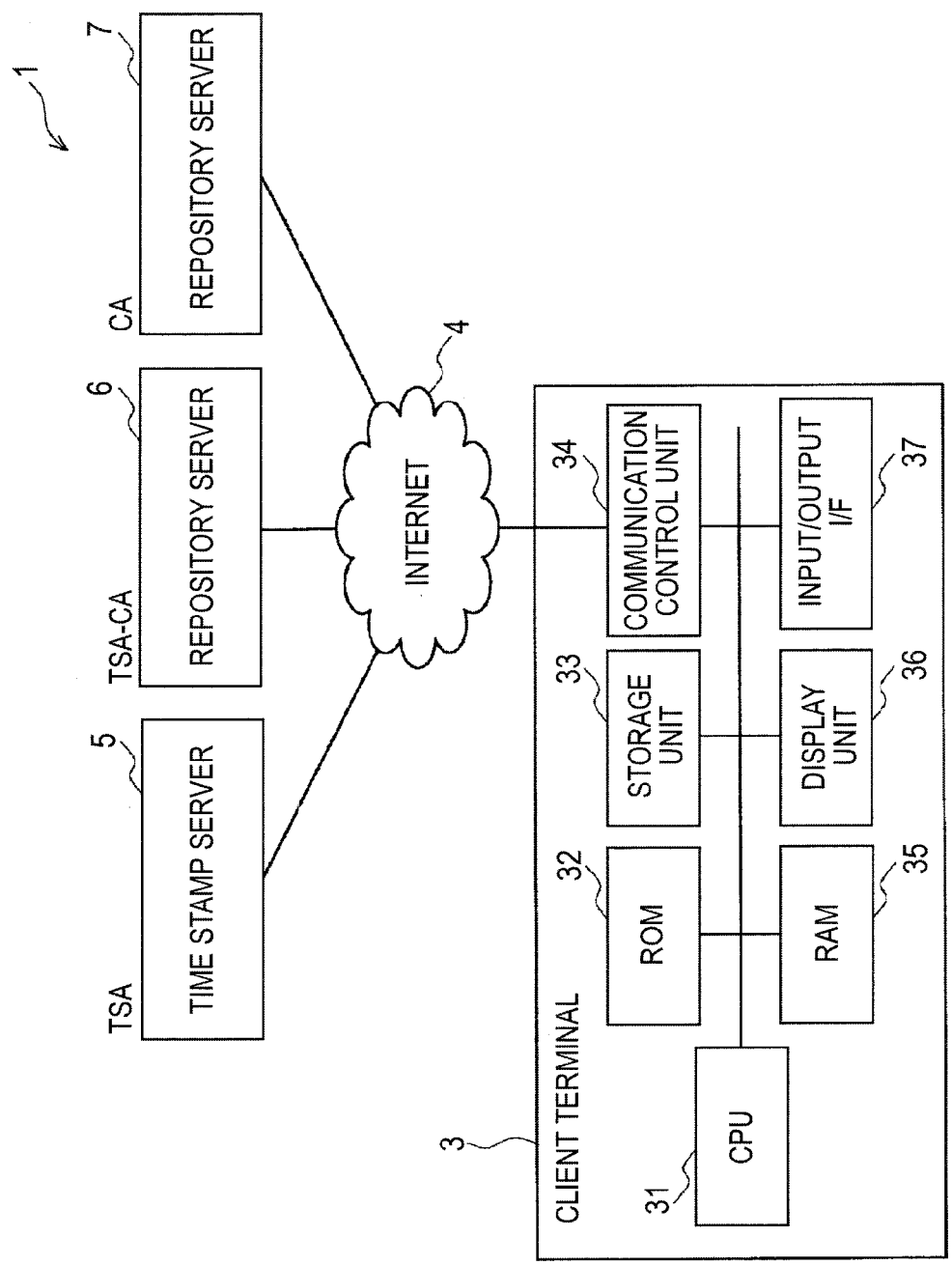
FIG. 1 is a diagram illustrating the configuration of a long-term signature system.

FIG. 1 is a diagram illustrating the configuration of a long-term signature system 1.

The long-term signature system 1 has a configuration in which a client terminal 3, a time stamp server 5, repository servers 6 and 7, and the like are connected to be communicable with each other through Internet 4.

The client terminal 3 has a central processing unit (CPU) 31, a read only memory (ROM) 32, a storage unit 33, a communication control unit 34, a random access memory (RAM) 35, a display unit 36, an input/output I/F 37, and the like.

The client terminal 3 creates long-term signature data while performing communication with the time stamp server 5, the repository server 6, and the repository server 7, and also performs respective processing relating to a long-term signature, such as creation of a package of long-term signature data (described below), management of the package of long-term signature data, and extension of the expiration date of long-term signature data.

The CPU 31 is a central processing unit which performs information processing or performs control of the respective units of the client terminal 3 according to a program stored in the storage unit 33 or the like.

Although in this embodiment, the respective processing relating to the long-term signature is performed according to a predetermined program, in regard to the management of the package of long-term signature data, confirmation of non-destruction of original data and long-term signature data, confirmation of the validity of the final archive time stamp (ATS) and expiration date management, and extension processing of long-term signature data are performed.

The ROM 32 is a read only memory and stores a basic program which is used to operate the client terminal 3, parameters, and the like.

The RAM 35 is a readable and writable memory and provides a work memory when the client terminal 3 performs the respective processing relating to the long-term signature.

The storage unit 33 is constituted by, for example, a high-capacity storage device, such as a hard disk, and stores an OS which is used to operate the client terminal 3, a program for performing the respective processing relating to the long-term signature, original data, long-term signature data, and an information file for confirming original data and long-term signature data as a package of long-term signature data.

The display unit 36 includes a display device using, for example, liquid crystal, a CRT, or the like and displays various screens which are used when the user of the client terminal 3 operates the client terminal 3.

The input/output I/F 37 includes an input/output device, such as a keyboard, a mouse, and an IC card reader/writer.

The IC card reader/writer is connected to an IC card and mediates communication between the client terminal 3 and the IC card.

The IC card is an information processing device including a CPU, a ROM, a RAM, an electrically erasable and programmable ROM (EEPROM), and the like and stores user authentication information for authenticating the user who uses the client terminal 3, or the like.

The communication control unit 34 performs communication with the time stamp server 5, the repository server 6, and the repository server 7 through Internet 4.

The time stamp server 5 is a server which issues a time stamp, and is provided in a Time Stamping Authority (TSA).

The time stamp server 5 has an accurate timepiece which is corrected by the time to be distributed by a time distribution station, if electronic data for which a time stamp is to be issued is received, appends electronic data with the current date and time by the timepiece, and performs an electronic signature (encryption) with a secret key for a time stamp to issue a time stamp.

When creating long-term signature data, the time stamp server 5 issues a signature time stamp (STS) or ATS to a signature value when an electronic signature is put on original data with the secret key of the user.

The repository server 6 is a server which is provided in a time stamping authority certificate authority (TSA-CA: time stamp certificate authority), and provides expiration information of a public key certificate (a public key certificate of a public key corresponding to a secret key used in a time stamp) for use in verification of the time stamp.

Since a public key certificate which is not listed up in the expiration information is not expired, it is thus possible to confirm the validity of the public key certificate and to confirm the validity of a time stamp by the valid public key certificate.

The repository server 7 is a server which is provided in a certificate authority (CA), and provides expiration information of a public key certificate (a public key certificate of a public key corresponding to a secret key of the client terminal 3) for use in verification of an electronic signature performed by the client terminal 3.

Since a public key certificate which is not listed up in the expiration information is not expired, it is thus possible to confirm the validity of the public key certificate and to confirm the validity of the electronic signature performed by the client terminal 3 by the valid public key certificate.

The expiration information which is provided by the repository server 6 and the repository server 7 is updated regularly (for example, every 24 hours) or irregularly.

Figure 2:
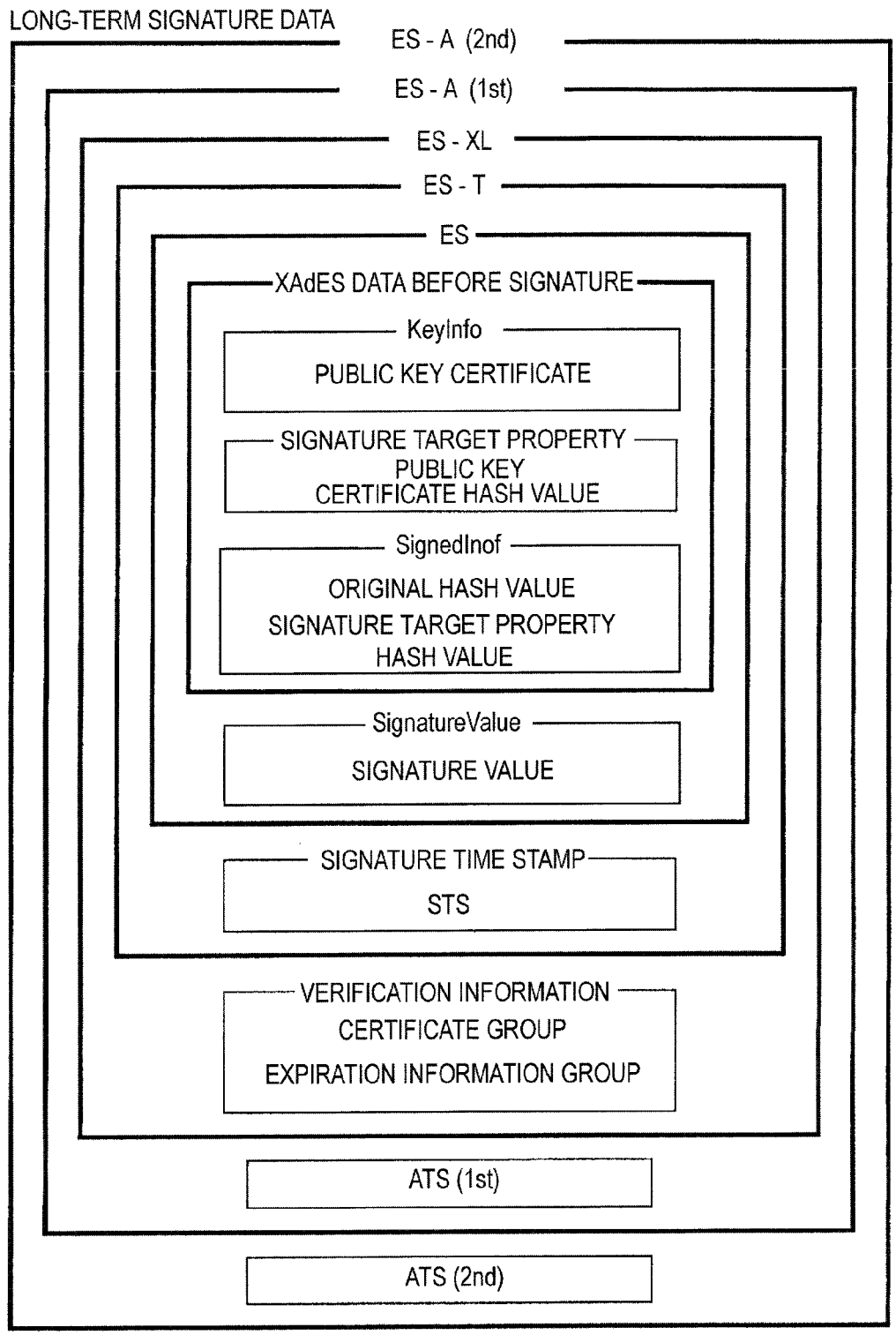
FIG. 2 is a diagram illustrating a format of long-term signature data.

FIG. 2 is a diagram illustrating a format of long-term signature data.

Long-term signature data of this embodiment is described using an extensible markup language (XML) according to the specification of XML advanced electronic signatures (XAdES).

This is an example, and long-term signature data may be generated by other schemes, such as PDF advanced electronic signatures (PAdES).

XAdES data before signature is an XML element which stores signature target data to be subjected to an electronic signature by the client terminal 3, and is constituted by elements of KeyInfo, signature target property, SignedInfo. The client terminal 3 performs an electronic signature on XAdES data before signature to generate ES.

In KeyInfo, a public key certificate of a public key corresponding to a secret key used for an electronic signature by the client terminal 3 is set. The public key certificate includes, for example, a public key, the owner of the public key, a certificate authority, the signature of the certificate authority, and the like.

In the signature target property, a hash value of a public key certificate is set.

In SignedInfo, an original hash value (a hash value of original data) and a hash value (hereinafter, referred to as a signature target property hash value) of a signature target property are set.

ES has the above-described XAdES data before signature and SignatureValue as elements.

In SignatureValue, a signature value in which the client terminal 3 performs a signature on SignedInfo with a secret key is set.

In this way, the client terminal 3 performs electronic signature on SignedInfo, whereby a signature is performed on XAdES data before signature.

ES-T has the above-described ES and a signature time stamp as elements.

In the signature time stamp, STS issued for ES is set. The STS is obtained by giving the current date and time to the hash value of SignatureValue in the time stamp server 5 and performing an electronic signature with the secret key of the time stamp server 5.

ES-XL (ES-XLong) has the above-described ES-T and verification information as elements.

The verification information is constituted using a certificate group and an expiration information group.

The certificate group is constituted by a public key certificate of a secret key used for a signature by the client terminal 3 and a public key certificate on an authentication path of a public key certificate of a secret key used for a time stamp by the time stamp server 5.

The authentication path refers to the confirmation of the verification of a public key certificate back to a root certificate authority in a certificate confidence routine in which a root certificate authority issues a self-signature certificate, the root certificate authority issues a certificate to a child certificate authority, a child certificate authority issues a certificate to a grandchild certificate authority, . . . , and a terminal certificate authority issues a certificate to an individual or a certificate owner.

The expiration information group is constituted by expiration information of a public key certificate.

ES-A (1st) has the above-described ES-XL and ATS (1st) as elements.

ATS (1st) is a first-generation ATS, and includes a hash value which is created from information for verifying ES-T, an original hash value, an electronic signature by the client terminal 3, a time stamp (STS) by the time stamp server 5, and the like by a predetermined method. The validity of ES-XL can be verified by ATS (1st).

For this reason, if ATS (1st) is valid, even when the expiration date of the signature value of ES has elapsed or has been expired, unfalsification of EX-XL can be certified by ATS (1st).

ES-A (2nd) has ES-A (1st) and ATS (2nd) as elements.

ATS (2nd) is a second-generation ATS, and includes a hash value which is generated from information for verifying ES-A (1st), an original hash value, an electronic signature by the client terminal 3, a time stamp (STS, ATS (1st)) by the time stamp server 5, and the like by a predetermined method. The validity of ATS (1st) can be verified by ATS (2nd).

ATS (2nd) has an expiration date longer than ATS (1st). For this reason, even when the expiration date of ATS (1st) has elapsed or has been expired, unfalsification of ES-A (1st) can be certified.

Though not shown, the generation can be further continued to ES-A (3rd) having ES-A (2nd) and ATS (3rd) as elements, ES-A (4th) having ES-A (3rd) and ATS (4th), . . . .

In this way, the generations of ATS are continued such that, when ATS (1st) is valid, the expiration date is extended by ATS (2nd), when ATS (2nd) is valid, the expiration date is extended by ATS (3rd), . . . , thereby extending the expiration date of long-term signature data endlessly.

From among ATS applied to long-term signature data, the latest-generation ATS becomes the final ATS, and if the final ATS is valid, unfalsification of long-term signature data can be certified.

Next, a generation procedure of XAdES will be described.

First, the client terminal 3 creates ES, transmits a time stamp request for the signature value of SignatureValue to the time stamp server 5 to issue STS, and generates ES-T.

Next, the client terminal 3 collects expiration information or the like relating to STS from the repository server 6, and collects expiration information or the like relating to the signature value from the repository server 7. Verification information is generated using the expiration information and applied to ES-T to generate ES-XL.

Next, for example, the client terminal 3 generates long-term signature target data having information for verifying ES-XL, original data, the original hash value, the signature value, STS, and the hash value of information including the verification information, and transmits a time stamp request to the time stamp server 5.

The time stamp server 5 generates a time stamp to the time stamp request for long-term signature target data, and transmits the time stamp to the client terminal 3 as ATS (1st).

The client terminal 3 applies ATS (1st) to ES-XL to generate ES-A (1st).

For example, ATS (2nd) is generated by applying the time stamp to the hash value computed on the basis of original data and ES-A (1st) by a predetermined method.

A generation method of XAdES may be arbitrary, and for example, a long-term signature server which performs these kinds of processing may be provided, the client terminal 3 may request the long-term signature server to generate XAdES, and the client terminal 3 may receive XAdES from the long-term signature server.

Figure 3:
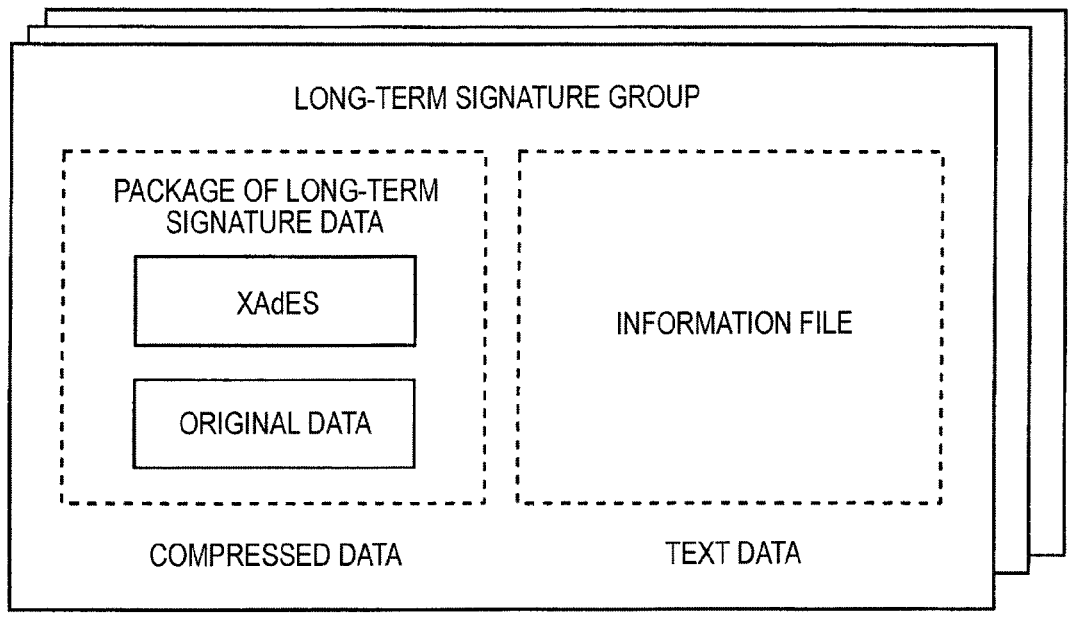
FIG. 3 is a diagram illustrating a long-term signature group.

FIG. 3 is a diagram illustrating a long-term signature group.

Although the client terminal 3 confirms whether or not original data is protected under long-term signature data or the expiration date of long-term signature data should be extended regularly or irregularly, in order to make the confirmation processing more efficient, the following long-term signature group is created.

FIG. 3(*a*) shows the configuration of a long-term signature group.

The long-term signature group is stored in the storage unit 33 of the client terminal 3 and constituted by a set of a package of long-term signature data and an information file.

The package of long-term signature data is obtained by compressing a set of original data and XAdES as long-term signature data of original data as a single file.

The information file is a file which stores management information for confirming the validity of the package of long-term signature data or for determining necessity for extension of the expiration date.

FIG. 3(*b*) is a diagram showing the content of an information file.

The information file is constituted by, for example, text data which is easy to read, and includes values for use in management, such as the package of long-term signature data file name, the hash value of the package of long-term signature data, the final ATS time, the final ATS expiration date, the serial number of the TSA certificate of the final ATS, the distribution point (uniform resource locators (URL)) of the expiration information of the TSA certificate of the final ATS, the original file name (the file name of original data), . . . .

From these kinds of information, the hash value of the package of long-term signature data is a hash value computed from the package of long-term signature data in a state where the package of long-term signature data is not destructed after the package of long-term signature data is generated.

Next, a creation procedure of a long-term signature group will be described.

If XAdES for original data is acquired, the client terminal 3 acquires the original file name from original data, and acquires the final ATS time, the final ATS expiration date, the serial number of the TSA certificate of the final ATS, the distribution point of the expiration information of the TSA certificate of the final ATS, and the like from XAdES.

Next, the client terminal 3 stores original data and XAdES, for example, in a single folder (directory) as a set and compresses each set (each folder) to generate a package of long-term signature data as a single file.

The client terminal 3 acquires the package of long-term signature data file name of the package of long-term signature data and computes the hash value from the package of long-term signature data.

Next, the client terminal 3 describes these acquired values in a text file to generate an information file.

Finally, the package of long-term signature data and the information file are stored in the same folder and, the same number is applied, or the like, and the package of long-term signature data and the information file are grouped to generate a long-term signature group.

The client terminal 3 stores the thus-created long-term signature group in a predetermined storage area of the storage unit 33.

For daily confirmation, the client terminal 3 computes the hash value of the package of long-term signature data, and compares the hash value of the package of long-term signature data with the hash value recorded in the information file to confirm non-destruction of the package of long-term signature data.

The client terminal 3 compares the final ATS expiration date recorded in the information file with the date and time of the confirmation point of time to determine necessity for extension of ATS.

The client terminal 3 also acquires the expiration information from the distribution point of the expiration information of the TSA certificate of the final ATS, and confirms that the TSA certificate is not expired.

In this way, since information which should be observed for each confirmation item is recorded in the information file, the client terminal 3 can determine the validity of the package of long-term signature data, that is, non-destruction of XAdES and original data, the validity of XAdES, or necessity for extension of ATS by the content recorded in the information file with a simple computational amount without decompressing the package of long-term signature data or analyzing the content of the package of long-term signature data.

Figure 4:
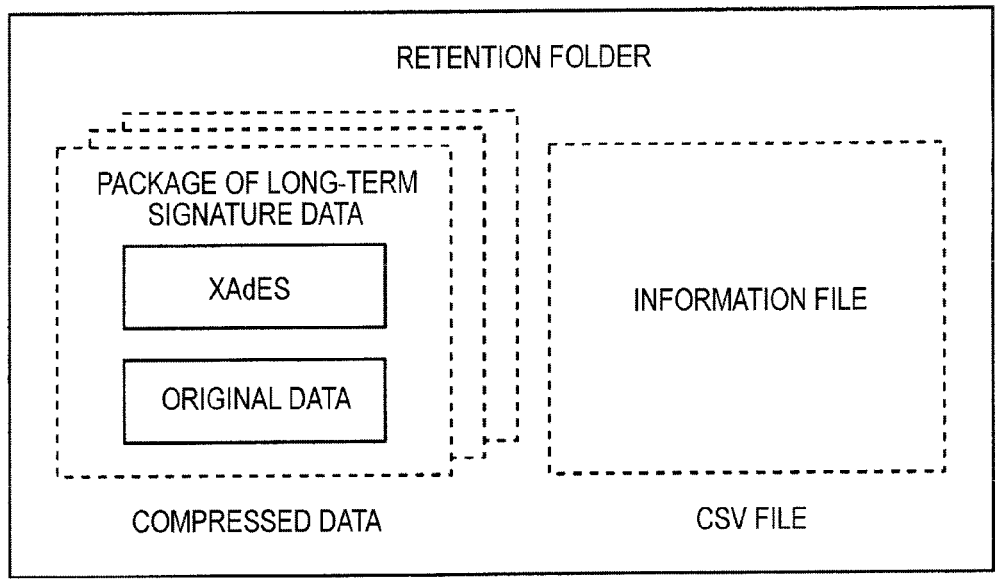
FIG. 4 is a diagram illustrating a modification of an information file.
Figure 4:
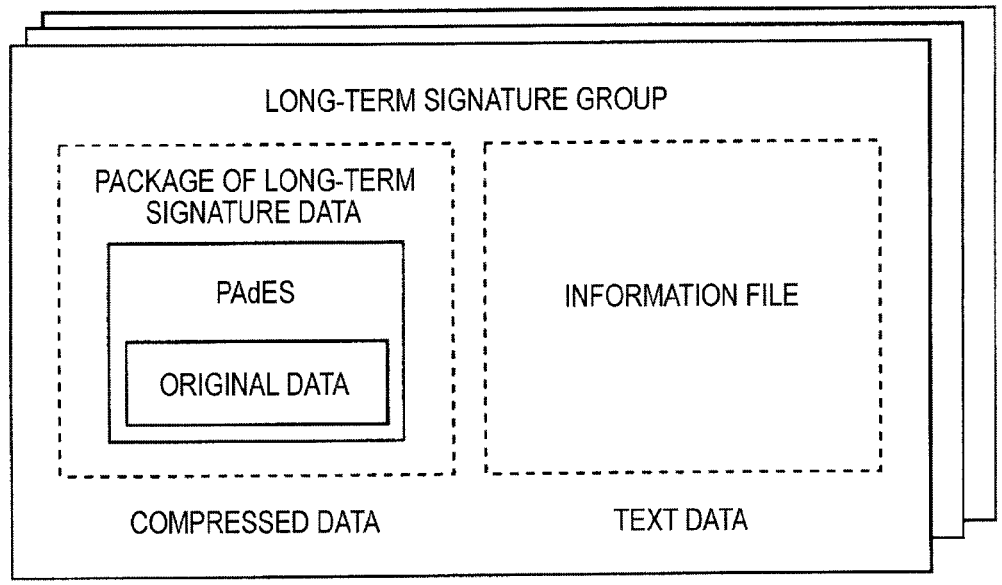

FIG. 4 is a diagram illustrating a modification of an information file.

FIG. 4(*a*) shows an example where an information file is not created for each package of long-term signature data and is constituted with a single file by comma separated values (CSV).

In the information file, information for each package of long-term signature data is classified and recorded, and the client terminal 3 compares each package of long-term signature data with the information file to perform determination.

The information file is formed in a format different from CSV or each package of long-term signature data may be managed using a database instead of the information file.

Although the package of long-term signature data described in the embodiment and the modification is compressed, uncompressed data may be used. In this case, original data and XAdES of original data are associated with each other by a certain method, and an information file for the association is created. In this case, a single information file is created for two files of original data and XAdES.

FIG. 4(b) shows an example where PAdES is used as a long-term signature scheme. Ina long-term signature by PAdES, since original data is included in PAdES, PAdES itself may be used as a package of long-term signature data. The package of long-term signature data may not be compressed.

Figure 5:
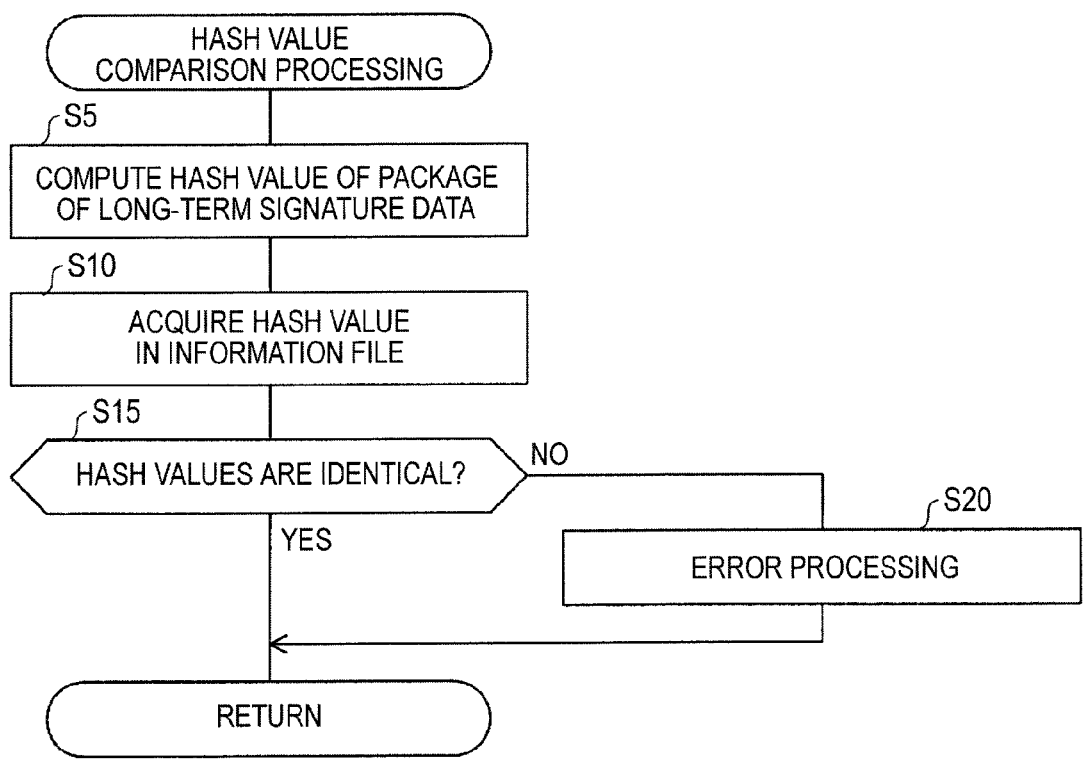
FIG. 5 is a flowchart illustrating a procedure of hash value comparison processing.

FIG. 5 is a flowchart illustrating a procedure of hash value comparison processing in which the client terminal 3 confirms non-destruction of a package of long-term signature data.

The following processing is performed by the CPU 31 of the client terminal 3 according to a predetermined program.

The client terminal 3 computes the hash value of the package of long-term signature data which is included in the long-term signature group to be confirmed (Step 5).

Next, the client terminal 3 acquires the hash value of the package of long-term signature data recorded in the information file (Step 10).

Next, the client terminal 3 determines whether or not the hash value computed from the package of long-term signature data and the hash value of the package of long-term signature data acquired from the information file are identical (Step 15).

When these hash values are identical (Step 15; Y), since the package of long-term signature data is not destructed, the client terminal 3 ends the confirmation relating to the long-term signature group and performs the same confirmation for the next long-term signature group.

When these hash values are not identical (Step 15; N), since the package of long-term signature data is destructed, the client terminal 3 records the confirmation result in a log and notifies the user of an error to perform error processing (Step 20).

In this way, the client terminal 3 uses the information file, thereby confirming non-destruction of XAdES and original data with a small computational amount without decompressing the package of long-term signature data.

Figure 6:
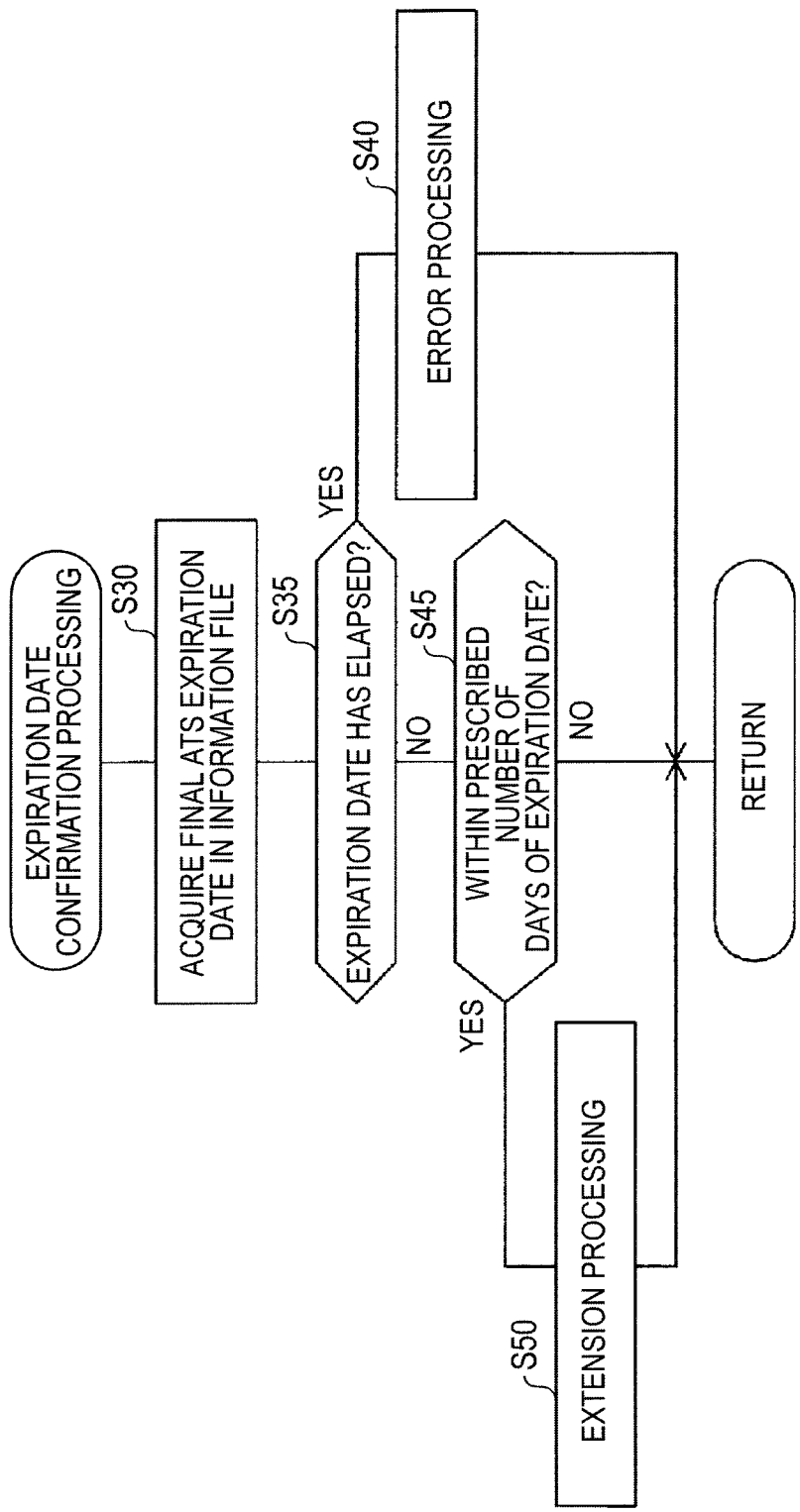
FIG. 6 is a flowchart illustrating a procedure of expiration date confirmation processing.

FIG. 6 is a flowchart illustrating a procedure of expiration date confirmation processing in which the client terminal 3 confirms the expiration date of the final ATS.

The client terminal 3 acquires the final ATS expiration date in the information file included in the long-term signature group to be confirmed (Step 30).

Next, the client terminal 3 determines whether or not the expiration date has elapsed (Step 35).

When the expiration date has elapsed (Step 35; Y), the client terminal 3 records the effect in a log and also notifies the user of the effect to perform error processing (Step 40).

When the expiration date has not elapsed (Step 35; N), the client terminal 3 determines whether or not the current point of time is within a prescribed number of days (for example, within 100 days) of the expiration date (Step 45).

When the current point of time is not within the prescribed number of days (Step 45; N), the client terminal 3 determines that extension is not required, ends the confirmation relating to the long-term signature group, and performs the same confirmation on the next long-term signature group.

When the current point of time is within the prescribed number of days (Step 45; Y), the client terminal 3 performs extension processing (Step 50).

In this way, the client terminal 3 uses the information file to determine necessity for extension without decompressing the package of long-term signature data and analyzing the final ATS.

Figure 7:
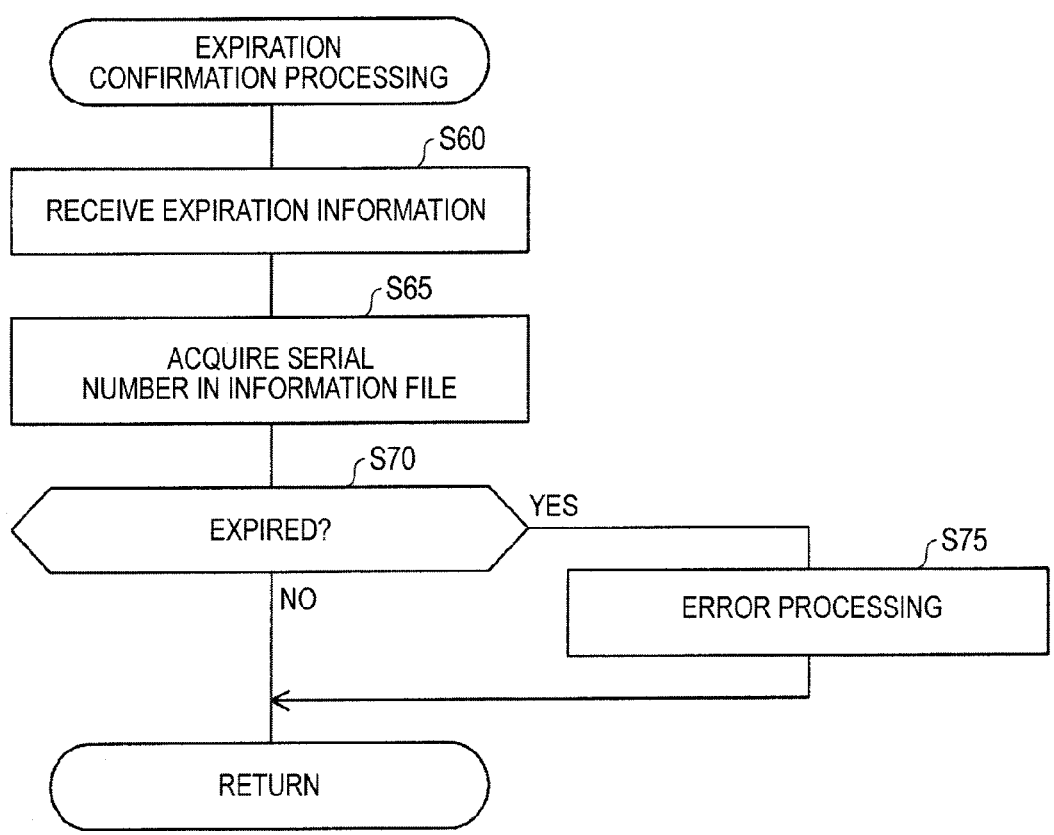
FIG. 7 is a flowchart illustrating a procedure of expiration confirmation processing.

FIG. 7 is a flowchart illustrating a procedure of expiration confirmation processing in which the client terminal 3 determines whether or not the final ATS is expired.

The client terminal 3 reads the distribution point of the expiration information of the TSA certificate of the final ATS recorded in the information file included in the long-term signature group to be confirmed, and receives expiration information from the repository server 6 recorded in the distribution point (Step 60).

Next, the client terminal 3 acquires the serial number of the TSA certificate of the final ATS recorded in the information file (Step 65).

Next, the client terminal 3 compares the serial number with the expiration information to determine whether or not the final ATS is expired (Step 70).

When the serial number is not recorded in the expiration information (Step 70; N), the client terminal 3 determines that the final ATS is not expired, ends the confirmation relating to the long-term signature group, and performs the same confirmation on the next long-term signature group.

When the serial number is recorded in the expiration information (Step 70; Y), the effect is recorded in a log and notified to the user to perform error processing (Step 75).

In this way, the client terminal 3 uses the information file to determine whether or not the final ATS is expired without decompressing the package of long-term signature data and analyzing the final ATS.

Although the hash value comparison processing, the expiration date confirmation processing, and the expiration confirmation processing have been described, the respective processing may be performed at a predefined interval, or the hash value comparison processing may be performed daily, the expiration date confirmation processing may be performed weekly, and the expiration confirmation processing may be performed monthly, respectively.

With the embodiment and the modification described above, the following effects can be obtained.

(1) The information file is used, thereby making processing necessary for management of package of long-term signature data more efficient.

(2) The hash value of the package of long-term signature data is computed and compared with the hash value recorded in the information file without analyzing original data or long-term signature data, thereby confirming non-destruction of original data or long-term signature data.

(3) Only by accessing the information file, it is possible to perform management of the expiration date of long-term signature data.

(4) Only by accessing the information file, it is possible to confirm the validity of ATS.

With the embodiment and the modification described above, the following configuration can be obtained.

A package of long-term signature data is constituted by combining original data and long-term signature data (XAdES), and functions as storage-target data to be stored over a long term.

The client terminal 3 functions as an information processing device which manages the protection state of original data by long-term signature data in storage-target data obtaining by combining the long-term signature data and the original data.

An information file functions as management information which records a management-target value (the hash value of the package of long-term signature data, the final ATS expiration date, the serial number of a TSA certificate of the final ATS, the distribution point of expiration information of the TSA certificate of the final ATS, or the like) for each management item, such as non-destruction of the package of long-term signature data, management of the expiration date of ATS, or validity of ATS, and in order to read the information file and to perform various kinds of information processing, the client terminal 3 includes management information acquisition means for acquiring management information having a management-target value for each management item obtained from the storage-target data recorded therein.

In order to read a management value, such as the hash value of the package of long-term signature data, from the information file, the client terminal 3 includes management-target value acquisition means for acquiring a management-target value of a predetermined management item from the acquired management information.

In order to compare a management value, such as the hash value acquired from the package of long-term signature data, the current date and time acquired from the outside, expiration information acquired from the outside, with a value acquired from the information file to determine the state of management, the client terminal 3 includes determination means for comparing the acquired management-target value with a value acquired from the storage-target data or a value acquired from the outside to determine the state of management.

In order to give notification of an error message by an output value of a determination result, to update the expiration date of long-term signature data, or the like, the client terminal 3 includes output means for outputting the determined determination result.

Since the package of long-term signature data is formed as a single file by compression or the like, the storage-target data is formed as a single file.

Since information, such as the hash value of the package of long-term signature data, the final ATS expiration date, the serial number of the TSA certificate of the final ATS, and the distribution point of the expiration information of the TSA certificate of the final ATS, recorded in the information file is a value acquired from the package of long-term signature data in advance, the management-target value is a value acquired from the storage-target data in advance.

When determining non-destruction of the package of long-term signature data, in order to compare the hash value of the package of long-term signature data read from the information file with the hash value computed from the package of long-term signature data to perform the determination, in the client terminal 3, one of the management items is the determination of non-destruction of the storage-target data, the management-target value acquisition means acquires the hash value of the storage-target data from the management information as a management-target value when it is confirmed that the storage-target data is not destructed, and the determination means computes the hash value of the storage-target data and compares the hash value of the storage-target data with the acquired hash value to determine non-destruction of the stored data.

In order to compare the final ATS expiration date read from the information file with the current date and time to determine necessity for extension of ATS, in the client terminal 3, one of the management items is the management of the expiration date of the long-term signature data, the management-target value acquisition means acquires the expiration date (final ATS expiration date) of the long-term signature data from the management information as a management-target value, and the determination means compares the determination time of the storage-target data with the acquired expiration date to determine necessity for extension of the expiration date of the long-term signature data.

In order to collect expiration information from the distribution point of the expiration information of the TSA certificate of the final ATS read from the information file and to compare the expiration information with the serial number of the TSA certificate of the final ATS recorded in the information file to determine the validity of the final ATS and consequently, the validity of XAdES, in the client terminal 3, one of the management items is the determination of the validity of the long-term signature data, the management-target value acquisition means acquires specification information for specifying an archive time stamp to be used by the long-term signature data and source information of expiration information of the archive time stamp from the management information as a management-target value, and the determination means acquires the expiration information using the acquired source information and compares the acquired expiration information with the acquired specification information to determine the validity of the long-term signature data.

The client terminal 3 executes an information processing program which causes a computer to exhibit a function of managing the protection state of original data by long-term signature data in storage-target data having the long-term signature data and the original data in combination, and causes the computer to realize a management information acquisition function of acquiring management information having a management-target value for each management item obtained from the storage-target data recorded therein, a management-target value acquisition function of acquiring a management-target value of a predetermined management item from the acquired management information, a determination function of comparing the acquired management-target value with a value acquired from the storage-target data or a value acquired from the outside to determine the state of management, and an output function of outputting the determined determination result.

The client terminal 3 has a function as an information processing device including storage-target data creation means for creating storage-target data having long-term signature data and original data in combination, management value acquisition means for acquiring a management value for each management item from the long-term signature data and the original data, and management information creation means for recording the acquired management value to create management information.

REFERENCE SIGNS LIST

1: long-term signature system
3: client terminal
4: Internet
5: time stamp server
6: repository server
7: repository server

The invention claimed is:

1. An information processing device which manages the protection state of original data by long-term signature data in storage-target data obtained by combining the long-term signature data and the original data, the information processing device comprising:
   a management information acquisition circuit for acquiring management information having a management-target value for each management item obtained from the storage-target data recorded therein;
   a management-target value acquisition circuit for acquiring a management-target value of a predetermined management item from the acquired management information;
   a determination circuit for comparing the acquired management-target value with a value acquired from the storage-target data or a value acquired from the outside to determine the state of management; and
   an output circuit for outputting a result corresponding to the determined state of management;
   wherein one of the obtained management items corresponds to the determination of non-destruction of the storage-target data;
   wherein the management-target value acquisition circuit acquires hash value of the storage-target data from the management information as a management-target value when it is confirmed that the storage-target data is not destructed;
   wherein the determination circuit computes the hash value of the storage-target data and compares the hash value of the storage-target data with the acquired hash value to determine non-destruction of the stored-target data;
   wherein another of the acquired management items is the determination of the validity of the long-term signature data;
   wherein the management-target value acquisition circuit acquires specification information for specifying an archive time stamp to be used by the long-term signature data and source information of expiration information of the archive time stamp from the management information as a management-target value; and
   wherein the determination circuit acquires the expiration information using the acquired source information and compares the acquired expiration information with the acquired specification information to determine the validity of the long-term signature data.

2. The information processing device according to claim 1, wherein the storage-target data is formed as a single file.

3. The information processing device according to claim 1, wherein the management-target value is a value acquired from the storage-target data in advance.

4. The information processing device according to claim 3, wherein another of the obtained management items corresponds to the management of the expiration date of the long-term signature data; wherein the management-target value acquisition circuit acquires the expiration date of the long-term signature data from the management information as a management-target value; and wherein the determination circuit compares the determination time of the storage-target data with the acquired expiration date to determine necessity for extension of the expiration date of the long-term signature data.

5. The information processing device according to claim 1, wherein another of the obtained management items corresponds to the management of the expiration date of the long-term signature data; wherein the management-target value acquisition circuit acquires the expiration date of the long-term signature data from the management information as a management-target value; and wherein the determination circuit compares the determination time of the storage-target data with the acquired expiration date to determine necessity for extension of the expiration date of the long-term signature data.

6. The information processing device according to claim 2, wherein another of the obtained management items corresponds to the management of the expiration date of the long-term signature data; wherein the management-target value acquisition circuit acquires the expiration date of the long-term signature data from the management information as a management-target value; and wherein the determination circuit compares the determination time of the storage-target data with the acquired expiration date to determine necessity for extension of the expiration date of the long-term signature data.

7. A non-transitory computer-readable storage medium having an information processing program stored therein, the information processing program, when executed, causing a computer to exhibit a function of managing the protection state of original data by long-term signature data in storage-target data obtained by combining the long-term signature data and the original data, the information processing program further causing the computer to realize:
   a management information acquisition function of acquiring management information having a management-target value for each management item obtained from the storage-target data recorded therein;
   a management-target value acquisition function of acquiring a management-target value of a predetermined management item from the acquired management information;
   a determination function of comparing the acquired management-target value with a value acquired from the storage-target data or a value acquired from the outside to determine the state of management; and
   an output function of outputting a result corresponding to the determined state of management;
   wherein one of the management items obtained by the management information acquisition function corresponds to the determination of non-destruction of the storage-target data;
   wherein the management-target value acquisition function acquires hash value of the storage-target data from the management information as a management-target value when it is confirmed that the storage-target data is not destructed;
   wherein the determination function computes the hash value of the storage-target data and compares the hash value of the storage-target data with the acquired hash value to determine non-destruction of the stored-target data;
   wherein another of the management items obtained by the management information acquisition function is the determination of the validity of the long-term signature data;
   wherein the management-target value acquisition function acquires specification information for specifying an archive time stamp to be used by the long-term signature data and source information of expiration information of the archive time stamp from the management information as a management-target value; and
   wherein the determination function acquires the expiration information using the acquired source information and compares the acquired expiration information with the acquired specification information to determine the validity of the long-term signature data.

8. The non-transitory computer-readable storage medium according to claim 7, wherein another of the management items obtained by the management information acquisition function corresponds to the management of the expiration date of the long-term signature data; wherein the management-target value acquisition function acquires the expiration date of the long-term signature data from the management information as a management-target value; and wherein the determination function compares the determination time of the storage-target data with the acquired expiration date to determine necessity for extension of the expiration date of the long-term signature data.

* * * * *